(12) United States Patent
Yu et al.

(10) Patent No.: US 9,535,400 B2
(45) Date of Patent: Jan. 3, 2017

(54) DIGITAL HOLOGRAM RECORDING SYSTEM AND NUMERICAL RECONSTRUCTION METHOD FOR HOLOGRAM

(71) Applicant: National Central University, Zhongli (TW)

(72) Inventors: Yeh-Wei Yu, Zhongli (TW); Ching-Cherng Sun, Zhongli (TW)

(73) Assignee: NATIONAL CENTRAL UNIVERSITY, Zhongli (TW)

( * ) Notice: Subject to any disclaimer, the term of this patent is extended or adjusted under 35 U.S.C. 154(b) by 143 days.

(21) Appl. No.: 14/153,673

(22) Filed: Jan. 13, 2014

(65) Prior Publication Data

US 2014/0240807 A1 Aug. 28, 2014

(30) Foreign Application Priority Data

Feb. 22, 2013 (TW) .............................. 102106255 A (51) Int. Cl.
*G03H 1/08* (2006.01)
*G03H 1/04* (2006.01)

(52) U.S. Cl.
CPC .............. *G03H 1/0808* (2013.01); *G03H 1/04* (2013.01); *G03H 1/041* (2013.01); *G03H 1/0443* (2013.01); *G03H 1/08* (2013.01); *G03H 1/0866* (2013.01); *G03H 2001/0445* (2013.01); *G03H 2001/0447* (2013.01); *G03H 2223/16* (2013.01)

(58) Field of Classification Search
CPC ............ G03H 1/04; G03H 1/08; G03H 1/041; G03H 1/0443; G03H 1/0808

USPC ....................................... 359/1, 9, 22, 29, 30
See application file for complete search history.

(56) References Cited

U.S. PATENT DOCUMENTS

| | | | |
|---|---|---|---|
| 5,956,447 A | 9/1999 | Zel'Dovich et al. | |
| 6,262,818 B1 * | 7/2001 | Cuche et al. | ...................... 359/9 |
| 6,330,086 B1 * | 12/2001 | Collot | .................. G03H 1/0005 359/28 |
| 6,832,859 B1 * | 12/2004 | Bell | ................... H04B 10/1141 385/31 |

(Continued)

FOREIGN PATENT DOCUMENTS

| | | |
|---|---|---|
| JP | 2009037685 A | 2/2009 |
| JP | 2009217281 A | 9/2009 |

(Continued)

*Primary Examiner* — Bumsuk Won
*Assistant Examiner* — William R Alexander
(74) *Attorney, Agent, or Firm* — Hauptman Ham, LLP (57) ABSTRACT

The present invention provides a digital hologram recording system and a numerical reconstruction method for a hologram, which are used for capturing an image of an object and recording it as a holographic data. Said system comprises: signal light, formed after irradiating the object with a light source; an image detector, for recording interference fringes of the signal light; and a light pipe, arranged in a path of the signal light and located between the object and the image detector, wherein the light pipe has a reflection surface, and a part of the signal light enters the image detector after reflected by the reflection surface of the light pipe. The present invention can make the collected signal equivalent to several times of the pixel counts of the image detector, thereby able to break through the spatial bandwidth limitation and shortening the amount of time required to measure the hologram.

21 Claims, 9 Drawing Sheets

(56) References Cited

U.S. PATENT DOCUMENTS

2002/0071145 A1* 6/2002 Roh ............................... 359/35
2013/0088568 A1* 4/2013 Nolte ................... A61B 5/0075
                                                          348/40
2013/0286403 A1* 10/2013 Matsubara et al. ........... 356/457

FOREIGN PATENT DOCUMENTS

TW              354986 B    12/2011
WO       2008/057646 A2     5/2008

* cited by examiner

DIGITAL HOLOGRAM RECORDING SYSTEM AND NUMERICAL RECONSTRUCTION METHOD FOR HOLOGRAM

CROSS-REFERENCE TO RELATED APPLICATIONS

This application claims priority to Taiwan Patent Application No. 102106255, filed on Feb. 22, 2013.

TECHNICAL FIELD OF THE INVENTION

The present invention relates to holography, and more particularly, to a digital hologram recording system and a numerical reconstruction method for a hologram.

BACKGROUND OF THE INVENTION

Holography is a technique that enables three-dimensional images to be presented. Holography is different from general photography that is only able to store intensity information. On the contrary, a hologram can record intensity and phase information. When the hologram is illuminated by an appropriate light source for reconstruction, a three-dimensional image that is exactly the same as the original one may appear at a position where the recording performs.

In holography, a light beam emitted from a laser source is generally divided into two beams via a beam splitter. One of them serves as a reference beam and the other is used to irradiate an object. The rays are diffracted after irradiating the object. The rays scattered from the object and the reference beam are interfered so as to form interference fringes, and these fringes are recorded by a film.

Digital holography is the technology of acquiring and processing holographic interference measurement data via an image detector. Digital holography typically delivers three-dimensional surface or optical thickness data of the object through numerical reconstruction of the recorded measurement data.

However, no matter what framework is taken in conventional digital holographic techniques, the numerical calculation is eventually limited to spatial bandwidth. This is explained by the following equation.

$$A \times B < f(N) \qquad (1)$$

where A represents a field of view (FOV), B is the inverse of resolution $B=1/u$, u is the resolution, and N is the total pixel counts of an image detector. That is to say, the image data that the image detector (e.g., CCD) is able to record is limited. To break through the spatial bandwidth limitation, a conventional aperture synthesis technical scheme is provided. By moving or shifting the image detector and letting it scan in two dimensions, this technical scheme is able to be equivalent to higher pixel counts. Although this approach smartly overcomes the pixel count limitation of the image detector, moving or shifting the image detector will increase complexity of the system and greatly increase the amount of time required to measure the hologram. It is difficult to practice.

SUMMARY OF THE INVENTION

An objective of the present invention is to provide a digital hologram recording system and a numerical reconstruction method for a hologram, for shortening the amount of time required to measure the hologram, reducing complexity of the system, and at the same time improving the quality of reconstructed images.

To achieve the above objective, the present invention provides a digital hologram recording system, which is used for capturing an image of an object and recording it as a holographic data, said system comprising: signal light, formed after irradiating the object with a light source; an image detector, for recording interference fringes of the signal light; and a light pipe, arranged in a path of the signal light and located between the object and the image detector, wherein the light pipe has a reflection surface, and a part of the signal light enters the image detector after reflected by the reflection surface of the light pipe.

In another aspect, the present invention provides a numerical reconstruction method for a hologram, which is applicable to an optical framework having a light pipe arranged between an image detector and an object to be captured, said method comprising steps of: utilizing the image detector to capture an interference image of the object; converting the interference image into a data matrix; performing multiple times of mirror reflections along multiple edges of the data matrix to expand to a new data matrix; and performing numerical reconstruction with the new data matrix so as to obtain field distribution on a plane where the object is located at.

The digital hologram recording system provided in the present invention has a light pipe arranged in the path of the signal light and between the object and the image detector. The light pipe has a reflection surface or a fully reflecting surface where the total reflection occurs, and this surface can be used to collect the signal light scatted at a large angle. Accompanying with the numerical reconstruction method for the hologram, the collected signal is equivalent to several times of the pixel counts of the image detector such that the present invention can break through the spatial bandwidth limitation. Compared to the conventional aperture synthesis technical scheme, the present invention can shorten the amount of time required to measure the hologram, reduce complexity of the system, and at the same time improve the quality of reconstructed images.

DETAILED DESCRIPTION OF THE INVENTION

The present invention provides a digital hologram recording system, in which a light pipe is added in a path of signal light. By arranging the light pipe in the path of the signal light, between an object (i.e., an object to be shot or captured) and an image detector (e.g., CCD and CMOS), the light pipe can collect the signal light scattered at a large angle with a reflection surface thereof. By making a copy of image matrix in subsequent numerical reconstruction, the present invention can overcome the limitation of pixel capability of the image detector, break through the spatial bandwidth limitation, and greatly improve the quality of reconstructed images.

Figure 1A:
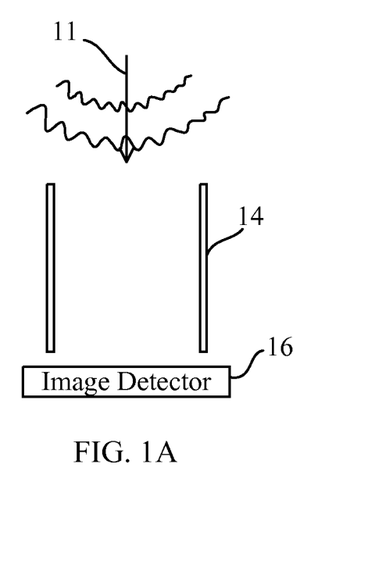
FIG. 1A is a schematic structural diagram showing a digital hologram recording system of the present invention.
Figure 1B:
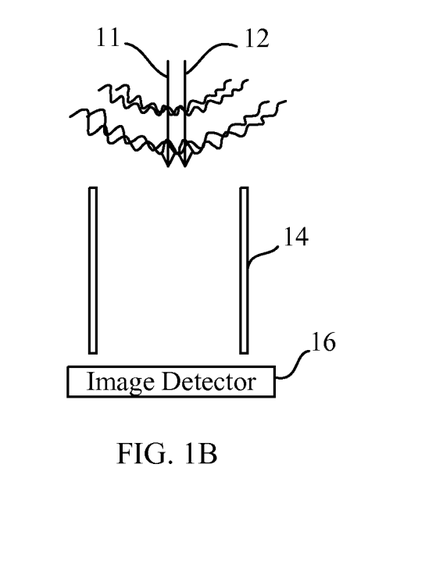
FIG. 1B is a schematic structural diagram showing another digital hologram recording system of the present invention.

Referring to FIG. 1A and FIG. 1B, which are schematic structural diagrams showing a digital hologram recording system of the present invention. The digital hologram recording system of the present invention comprises signal light 11, which is formed after irradiating an object with a light source; an image detector 16 used for recording interference fringes of the signal light 11; and a light pipe 14, which is arranged in a path of the signal light 11 and located between the object and the image detector 16, wherein the light pipe 14 has a reflection surface, and a part of the signal light 11 enters the image detector 16 after reflected by the reflection surface of the light pipe 14. The reflection surface of the light pipe 14 is utilized to collect those signal light rays scattered at a large angle. This is equivalent to placing image detectors at mirror positions with respect to the reflection surface of the light pipe 14, and therefore this is also equivalent to increasing the total pixel counts of the image detector 16.

In FIG. 1A, the light source used to form the signal light 11 is identical to the one used to irradiate the object. The signal light 11 is interfered with light rays emitted from the light source so as to generate the interference fringes. In addition, as shown in FIG. 1B, the image detector 16 is used to record the interference fringes that are generated from the interference between the signal light 11 and a reference beam 12. In this case, light rays emitted from the same light source can be split into two beams by a beam splitter (BS). One of the two beams serves as the reference beam 12 and the other one forms the signal light 11 after irradiating the object. In a concrete implementation, the light source can be implemented by a light emitting diode (LED) or a laser. When the light source is a laser source, a wavelength tuning element (e.g., an acousto-optic modulator, AOM) can be added so as to make one beam or the two beams shift in wavelength, as the function of a hetero interferometer.

The light pipe 14 can be implemented by the following two ways. One is that the light pipe 14 has a reflecting film coated on the side surfaces thereof. The other way is that the light pipe 14 is solid without having to coat the reflecting film, in which reflecting light rays is achieved by total reflection occurred on the interface. The transverse section of the light pipe 14 is preferably rectangular, and it is also can be a triangle, a quadrilateral, a pentagon, a hexagon, or other polygons.

The digital hologram recording system provided in the present invention has the light pipe 14 arranged in the path of the signal light 11 and located between the object and the image detector 16. The light pipe 14 has the reflection surface or a fully reflecting surface where the total reflection occurs, and this surface can be used to collect the signal light scatted at a large angle. In subsequent numerical reconstruction, the collected signal is equivalent to several times of the pixel counts of the image detector 16 such that the present invention can break through the spatial bandwidth limitation. Compared to the conventional aperture synthesis technical scheme, the present invention can shorten the amount of time required to measure the hologram, reduce complexity of the system, and at the same time improve the quality of reconstructed images.

Figure 2A:
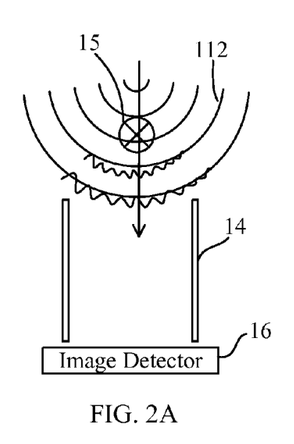
FIG. 2A is a schematic diagram showing a digital hologram recording system implemented according to a first embodiment of the present invention.

FIG. 2A is a schematic diagram showing a digital hologram recording system implemented according to a first embodiment of the present invention. In the first embodiment of the present invention, a light source that emits approximate spherical light waves 112 is used to irradiate an object 15, and said light source and the object 15 are arranged on the same optical axis. The light rays diffracted from the object 15 are interfered with the spherical light waves 112, and then the interference fringes are recorded by the image detector 16. There is a light pipe 14 disposed between the object 15 and the image detector 16. The light pipe 14 has a reflection surface or a fully reflecting surface on the side wall thereof, and this surface can collect the interference signals at a large scattering angle.

Figure 2B:
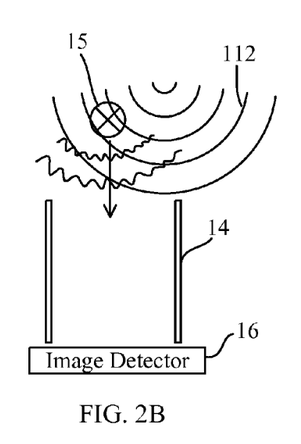
FIG. 2B is a schematic diagram showing a digital hologram recording system implemented according to a second embodiment of the present invention.

FIG. 2B is a schematic diagram showing a digital hologram recording system implemented according to an second embodiment of the present invention. The difference between the second embodiment and the first embodiment is that the light source that emits the spherical waves deviates from the optical axis in the second embodiment. That is to say, said light source and the object 15 are not arranged on the same optical axis. This arrangement can solve the problem of large amount of noise signals caused by arranging said light source and the object 15 on the same optical axis.

Figure 2C:
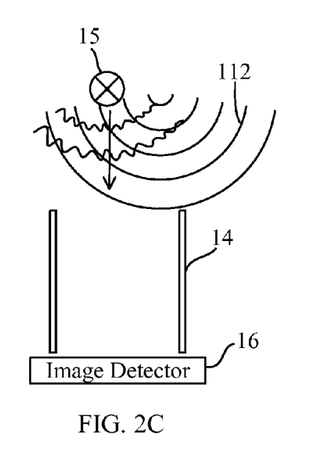
FIG. 2C is a schematic diagram showing a digital hologram recording system implemented according to a third embodiment of the present invention.

FIG. 2C is a schematic diagram showing a digital hologram recording system implemented according to a third embodiment of the present invention. The differences between the third embodiment, the first embodiment, and the second embodiment are that in the third embodiment, both of the object 15 and the light source emitting the spherical waves are arranged on a plane parallel to the surface of the image detector 16, and the spherical light waves 112 servers as a reference beam while the object 15 is irradiated by another light beam. In order to produce the interference fringes, the light beam used to irradiate the object 15 and the reference beam usually are generated from the same laser source. The third embodiment of the present invention can reduce noise.

Figure 2D:
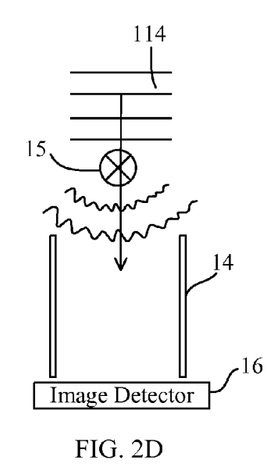
FIG. 2D is a schematic diagram showing a digital hologram recording system implemented according to a fourth embodiment of the present invention.
Figure 2E:
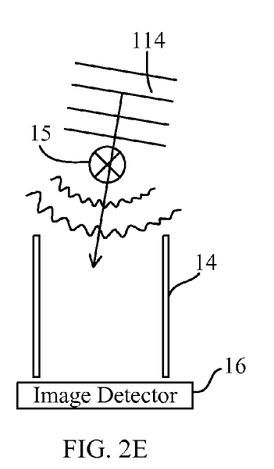
FIG. 2E is a schematic diagram showing a digital hologram recording system implemented according to a fifth embodiment of the present invention.
Figure 2F:
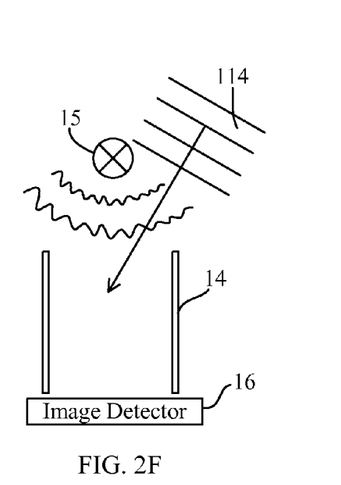
FIG. 2F is a schematic diagram showing a digital hologram recording system implemented according to a sixth embodiment of the present invention.

FIG. 2D, FIG. 2E, and FIG. 2F are schematic diagrams showing digital hologram recording systems implemented respectively according to a fourth embodiment, a fifth embodiment, and a sixth embodiment of the present invention. The embodiments shown in FIG. 2D, FIG. 2E, and FIG. 2F are respectively to substitute the spherical light waves 112 in FIG. 2A, FIG. 2B, and FIG. 2C with plane waves 114. That is to say, in addition to use the spherical light waves to irradiate the object 15, the present invention also can use the plane waves 114 or slanting plane waves to irradiate the object 15 and other light sources producing different types of wavefronts are applicable as well. Additionally, in the sixth embodiment shown in FIG. 2F, the plane waves 114 are served as a reference beam while the object 15 is irradiated by another light beam. The light beam used to irradiate the object 15 and the reference beam are generated from the same laser source.

Figure 3A:
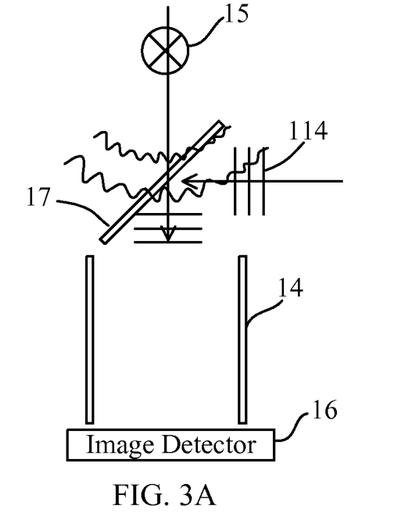
FIG. 3A is a schematic diagram showing a digital hologram recording system implemented according to a seventh embodiment of the present invention.
Figure 3B:
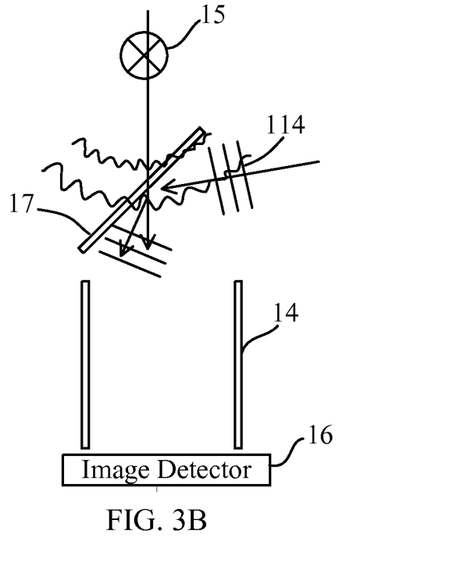
FIG. 3B is a schematic diagram showing a digital hologram recording system implemented according to an eighth embodiment of the present invention.
Figure 3C:
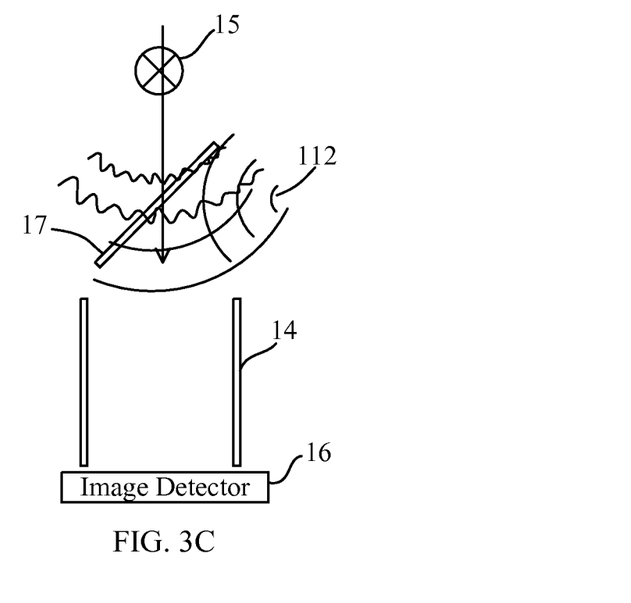
FIG. 3C is a schematic diagram showing a digital hologram recording system implemented according to a ninth embodiment of the present invention.

FIG. 3A, FIG. 3B, and FIG. 3C are schematic diagrams showing digital hologram recording systems implemented respectively according to a seventh embodiment, an eighth embodiment, and a ninth embodiment of the present invention. The digital hologram recording systems shown in FIG. 3A, FIG. 3B, and FIG. 3C all have an optical element, i.e., a beam splitter 17. The beam splitter 17 is able to direct the signal light and the reference beam to the image detector 16 for interfering with each other. The light rays formed after irradiating the object 15 are the so-called signal light. Another light beam coming from the same light source but split via the beam splitter 17 is the so-called reference beam that is used to interfere with the signal light. The reference beam can be implemented by plane waves (e.g., the seventh embodiment shown in FIG. 3A), slanting plane waves (e.g., the eighth embodiment shown in FIG. 3B), spherical waves (e.g., the ninth embodiment shown in FIG. 3C), or other types of light waves. The reference beam and the light beam used to irradiate the object usually are generated from the same laser source.

FIGS. 4A to 4F are schematic diagrams showing digital hologram recording systems implemented respectively according to $10^{th}$-$15^{th}$ embodiments of the present invention. The embodiments shown in FIGS. 4A to 4F are to add a lens 18 or a lens group in the path of the signal light respectively to the embodiments shown in FIGS. 2A to 2F for adjusting the distribution of the signal light.

Figures 4A, 4B:
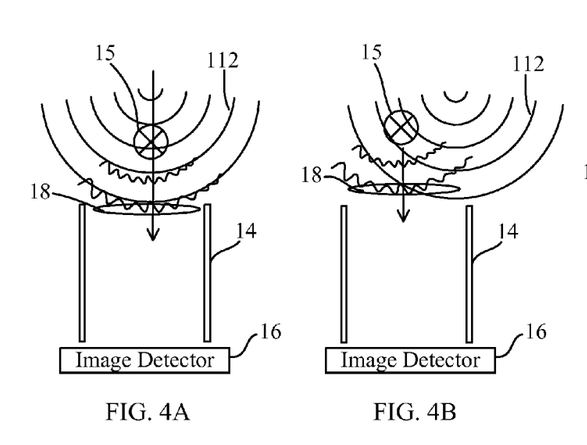
FIG. 4A is a schematic diagram showing a digital hologram recording system implemented according to a tenth embodiment of the present invention.
FIG. 4B is a schematic diagram showing a digital hologram recording system implemented according to a eleventh embodiment of the present invention.
Figure 4C:
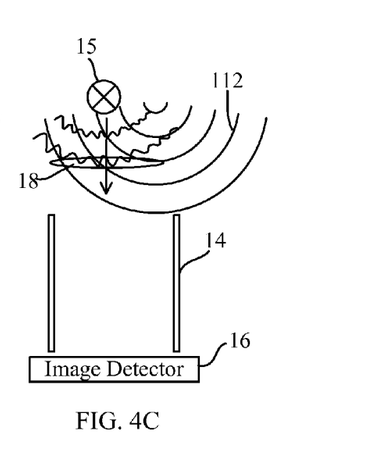
FIG. 4C is a schematic diagram showing a digital hologram recording system implemented according to a twelfth embodiment of the present invention.
Figure 4D:
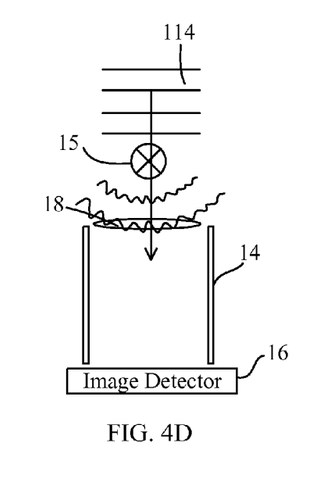
FIG. 4D is a schematic diagram showing a digital hologram recording system implemented according to a thirteenth embodiment of the present invention.
Figure 4E:
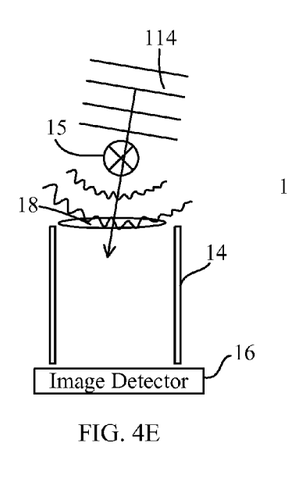
FIG. 4E is a schematic diagram showing a digital hologram recording system implemented according to a fourteenth embodiment of the present invention.
Figure 4F:
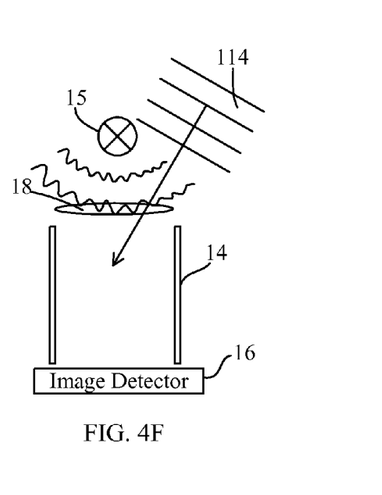
FIG. 4F is a schematic diagram showing a digital hologram recording system implemented according to a fifteenth embodiment of the present invention.
Figure 4G:
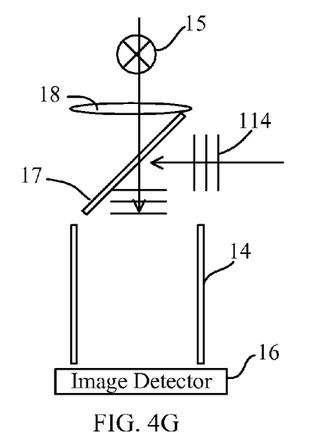
FIG. 4G is a schematic diagram showing a digital hologram recording system implemented according to a sixteenth embodiment of the present invention.
Figure 4H:
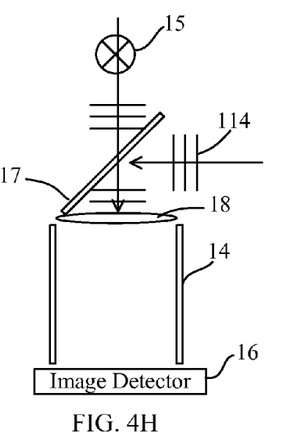
FIG. 4H is a schematic diagram showing a digital hologram recording system implemented according to a seventeenth embodiment of the present invention.

FIG. 4G and FIG. 4H are schematic diagrams showing digital hologram recording systems implemented respectively according to a sixteenth embodiment and a seventeenth embodiment of the present invention. The difference between the sixteenth embodiment shown in FIG. 4G and the embodiment shown in FIG. 3A is that in the sixteenth embodiment, a lens 18 or a lens group is arranged in the path of the signal light and located between the object 15 and the beam splitter 17 for adjusting the distribution of the signal light. The difference between the seventeenth embodiment shown in FIG. 4H and the embodiment shown in FIG. 3A is that in the seventeenth embodiment, a lens 18 or a lens group is arranged in the path of the signal light and located between the beam splitter 17 and the image detector 16 for adjusting the distribution of the interference fringes.

Figure 4I:
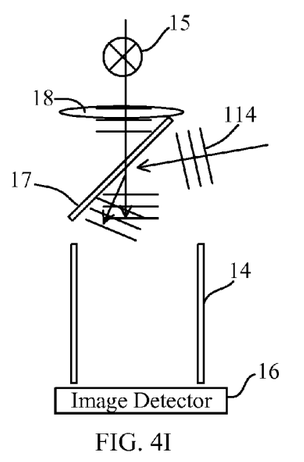
FIG. 4I is a schematic diagram showing a digital hologram recording system implemented according to a eighteenth embodiment of the present invention.
Figure 4J:
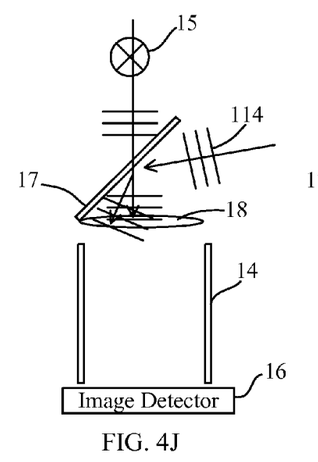
FIG. 4J is a schematic diagram showing a digital hologram recording system implemented according to a nineteenth embodiment of the present invention.
Figure 4K:
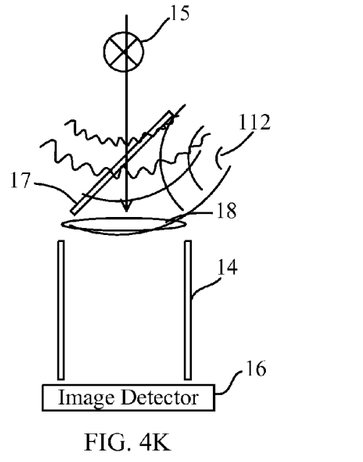
FIG. 4K is a schematic diagram showing a digital hologram recording system implemented according to a twentieth embodiment of the present invention.
Figure 5A:
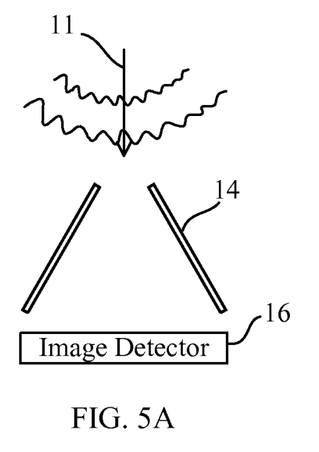
FIGS. 5A to 5D are schematic diagrams showing that the side wall of the light pipe is oblique according to embodiments of the present invention.
Figure 5B:
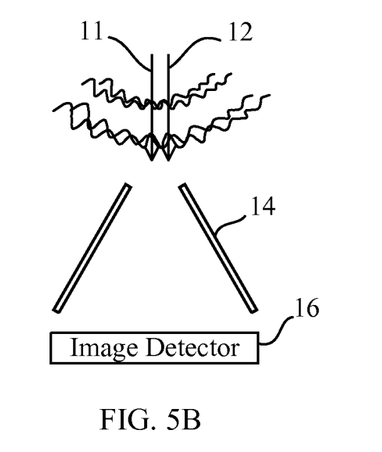
Figure 5C:
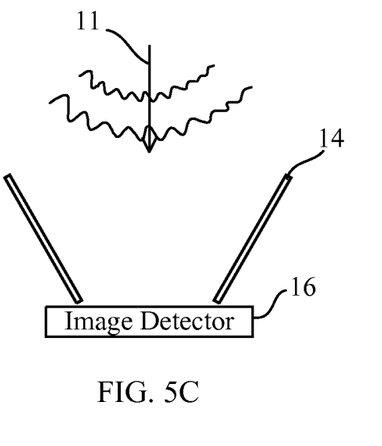
Figure 5D:
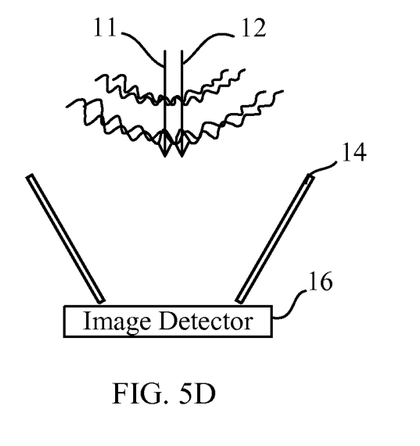

FIGS. 4I to 4K are schematic diagrams showing digital hologram recording systems implemented respectively according to $18^{th}$-$20^{th}$ embodiments of the present invention. The embodiment shown in FIG. 4I is to substitute the plane waves 114 in FIG. 4G with the slanting plane waves. The embodiment shown in FIG. 4J is to substitute the plane waves 114 in FIG. 4H with the slanting plane waves. The embodiment shown in FIG. 4J is to substitute the plane waves 114 in FIG. 4H with the spherical waves.

FIGS. 5A to 5D are schematic diagrams showing that the side wall of the light pipe is oblique according to embodiments of the present invention. Compared to the light pipe 14 having the side wall perpendicular to the surface plane of the image detector 16 as shown in FIG. 1A and FIG. 1B of the present invention, the side wall of the light pipe 14 also can be arranged to be oblique as shown in FIGS. 5A to 5D. Preferably, the angle between the side wall of the light pipe 14 and a middle vertical line is between −70° and 70°. In addition, the transverse sectional area of the light pipe 14 can be larger or smaller than the area of the image detector 16. That is to say, the transverse sectional area of the light pipe 14 does not have to be identical to the area of the image detector 16.

Figure 6:
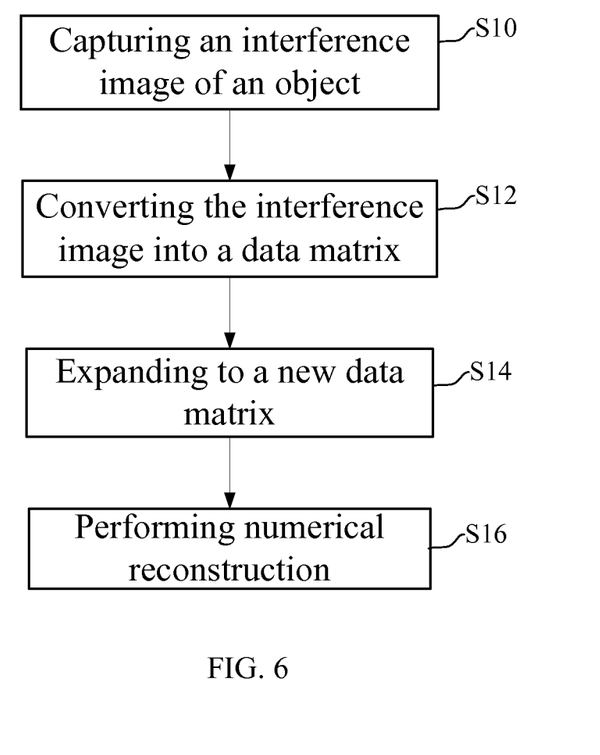
FIG. 6 is a flow chart of a numerical reconstruction method for a hologram implemented according to the present invention.

FIG. 6 is a flow chart of a numerical reconstruction method for a hologram implemented according to the present invention. The numerical reconstruction method provided in the present invention is applicable to an optical framework having a light pipe arranged between an image detector and an object to be captured. The afore-said method comprises the following steps.

STEP S10: the image detector is utilized to capture an interference image of the object.

STEP S12: the interference image is converted into a data matrix.

STEP S14: multiple times of mirror reflection are performed along multiple edges of the data matrix to expand to a new data matrix.

STEP S16: numerical reconstruction is performed with the new data matrix so as to obtain field distribution on a plane where the object is located at.

Figure 7:
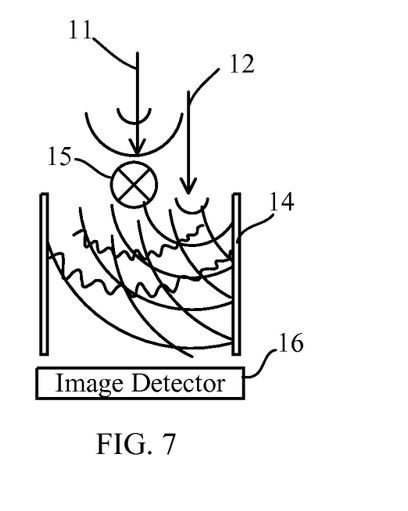
FIG. 7 is a schematic diagram showing a digital hologram recording system implemented according to one of the embodiments of the present invention.

Please refer to FIG. 7. The numerical reconstruction method for a hologram provided in the present invention will be illustrated in accompany with the digital hologram recording system shown in FIG. 7. The digital hologram recording system of FIG. 7 uses divergent spherical waves generated by a point light source to irradiate the object 15. The reference beam 12 is also formed by divergent spherical waves. The object 15 and the point light source used to generate the reference beam 12 are located at the same plane that is parallel to the surface of the image detector 16. The light pipe 14 is arranged between the object 15 and the image detector 16. The image detector 16 can receive the original signal light 11 and reference beam 12, and also the signal light 11 and reference beam 12 that are reflected by the side wall of the light pipe 14.

Before performing the numerical reconstruction, a high dynamic range imaging technique can be utilized for acquiring better quality of the holographic image. Because the signals are overlapped after multiple reflections via the light pipe, at this situation it can increase image dynamic range at the time of image capture and store image variations by using more bits, in order to get an image that is much subtle in details. When taking pictures of the object, the same scene is taken for many times with different time lengths for exposure. Then, the obtained pictures are recombined by using the high dynamic range imaging technique such that a high-dynamic-range interference image is acquired. By using this high-dynamic-range interference image, a reconstructed high-quality holographic image can be achieved.

Figure 8A:
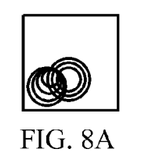
FIGS. 8A to 8F are schematic diagrams showing that the data matrix is expanded in the numerical reconstruction method of the present invention.
Figure 8B:
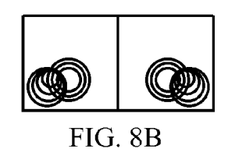
Figure 8C:
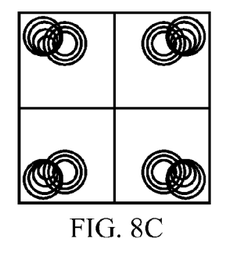
Figure 8D:
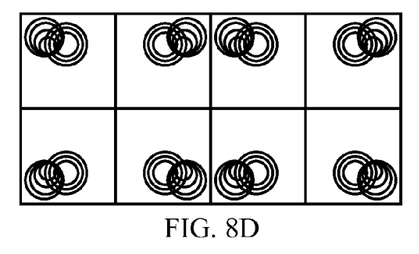
Figure 8E:
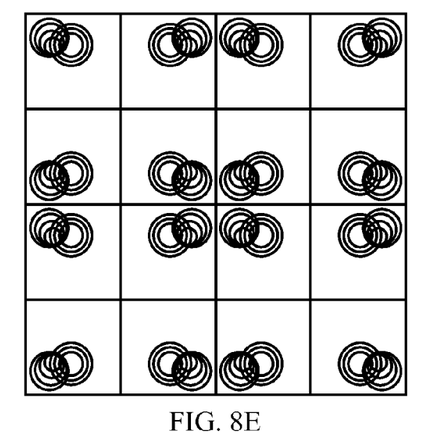
Figure 8F:
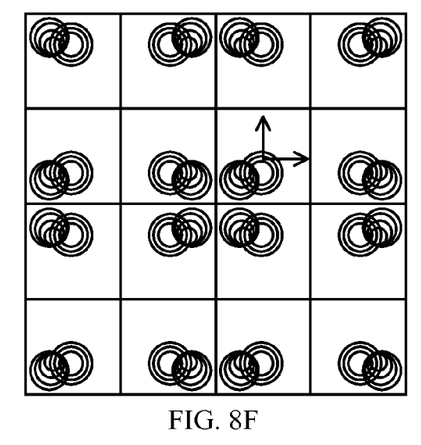

Assume that the tilt angle of the side wall of the light pipe is zero degree and an image obtained from above steps is just as shown in FIG. 8A. After the obtained image is converted into a two-dimensional data matrix by means of hardware, the two-dimensional data matrix is expanded by mirror reflections. The expansion is limited to the reflectivity of the light pipe and the dynamic range of the image detector. The way to expand is continuously performing mirror reflection on the data matrix along one of its edges. For example, the data matrix shown in FIG. 8A is mapped along its right edge to obtain FIG. 8B, FIG. 8B is mapped along its upper edge to obtain FIG. 8C, FIG. 8C is mapped along its left edge to obtain FIG. 8D, and FIG. 8D is mapped along its lower edge to obtain FIG. 8E. In such a manner, the data matrix can be constantly augmenting. Accordingly, the present invention can break through the spatial bandwidth limitation by performing numerical reconstruction with the expanded data matrix. Each newly augmented data matrix is represented by $U_{i,j}(x,y)$ herein. As shown in FIG. 8F, each augmented matrix in the data matrix eventually formed can be represented by:

$$U_{i,j}(x,y) = U_{00}((-1)^i x, (-1)^j y), \quad (2)$$

If taking consideration of the effect caused by the reflectivity (Re) of the reflection surface of the light pipe, each augmented matrix can be modified as:

$$U_{i,j}(x,y) = U_{00}((-1)^i x, (-1)^j y)/Re^{|i|+|j|}, \quad (3)$$

The matrix formed or expanded from Equation (2) or (3) is called $U_{mn}$, which is the interference result of the signal light ($S_{mn}$) and the reference light beam ($R_{mn}$) and is represented as follows.

$$U_{mn} = |R_{mn}|^2 + |S_{mn}|^2 + R_{mn}S_{mn}^* + R_{mn}^*S_{mn}, \quad (4)$$

Then, numerical reconstruction is performed by using the new data matrix so as to obtain filed distribution on a plane where the object is located at. Except for the signal term that is to be used for the reconstruction, other terms are noise terms. If using $R_{mn}S_{mn}^*$ for reconstruction, it has to multiply $U_{mn}$ by $R_{mn}^*$ and propagate to the object plane (i.e., the plane where the object is located at) along a positive direction. If using $R_{mn}^*S_{mn}$ for reconstruction, it has to multiply $U_{mn}$ by $R_{mn}$ and propagate to the object plane along a negative direction. The negative propagation is to multiply the propagating distance by −1. It is noted that $R_{mn}$ is the distribution of reference beam where the reference beam propagates to the range of expanded matrix $U_{mn}$ through free space or through a medium with constant refractive index, rather than expanding from the reference beam distribution in $U_{00}$.

However, in addition to the desired signals, at this time other noise signals also exist on the object plane. The way to remove the noise includes phase shift interferometer, iterative algorithm, spacial filter, and so on. They are not detailed herein.

Assume that the reference light is consisted of divergent spherical waves and a point source used to generate the reference light is located a plane identical to the object plane. Since the distribution formed by propagating the spherical waves to the image detector is equivalent to the phase distribution of a spherical lens, the filed distribution on the object plane is equal to the result obtained by performing Fourier transformation on $U_{mn}$ when the distance between the object plane and the image detector is long enough. Herein, a fast Fourier transformation can be used for calculation so as to obtain the filed distribution on the object plane.

$$\text{Target} = \text{FFT}(U_{mn}), \quad (5)$$

The point source used to generate the reference light is located a plane identical to the object plane but the distance between the object and said point source is too large. In this case, a phase term can be added for the translation, i.e., $$\text{Target} = FFT\left\{U_{mn}\exp\left[i2\pi\left(x_{mn}\frac{\Delta x}{\lambda z_0} + y_{mn}\frac{\Delta y}{\lambda z_0}\right)\right]\right\}, \quad (6)$$

where $\Delta x$ and $\Delta y$ are displacements respectively in the x direction and y direction, and ($x_{mn}$, $y_{mn}$) is a coordinate of the expanded matrix, represented as follows.

$$x_{mn} = t_1 B_x - \frac{mL_x}{2}, \quad (7)$$

$$y_{mn} = t_2 B_y - \frac{nL_y}{2}, \quad (8)$$

where $L_x$ and $L_y$ respectively are the lengths in the x direction and y direction, which the image range of the image detector corresponds to, $t_1$ indicates $t_1$-th column in the matrix, $t_2$ indicates $t_2$-th row in the matrix, and $B_x$ and $B_y$ are pixel pitches of the image detector respectively in the x direction and y direction.

If a plane where the point source used to generate the reference light is located at is not identical to the object plane, the calculation is more complicate. First of all, multiply $U_{mn}$ by $R_{mn}$ or $R_{mn}^*$ so as to obtain $S_{mn}$ matrix, which represents a matrix of the signal light. If using the following equation, $$S_{mn} = R_{mn}^* U_{mn}, \quad (9)$$

the propagating distance used for reconstructing the filed distribution on the object plane is the real distance in the space. If using the following equation, $$S_{mn} = R_{mn} U_{mn}, \quad (10)$$

the propagating distance used for reconstructing the filed distribution on the object plane is the result obtained by multiplying the real distance in the space by −1.

The calculations mentioned in Equations (5) to (10) are simplified calculations for special cases. If the system does not meet a condition for simplification, angular spectrum propagation is usually used for calculating the light intensity distribution that light propagates from any initial plane to any object plane when performing the numerical reconstruction with the expanded new data matrix. Its calculation is represented as follows.

$$FU_1 = FFT(U_0) \exp(i2\pi z/\lambda (1-\alpha^2-\beta^2)^{0.5}), \quad (11)$$

$$\alpha = t_1 \lambda / L_{x0}, \quad (12)$$

$$\beta = t_2 \lambda / L_{y0}, \quad (13)$$

where $\lambda$ indicates wavelength of the light rays from the light source, FFT indicates a fast Fourier transformation, $U_0$ is the initial plane, $U_1$ is the object plane, $FU_1$ is the spectrum distribution on the object plane, $L_{x0}$ and $L_{y0}$ respectively are the lengths in the x direction and y direction, which the image range of $U_0$ corresponds to, $t_1$ indicates $t_1$-th column in the matrix, $t_2$ indicates $t_2$-th row in the matrix, and z represents the propagating distance. Finally, an inverse fast Fourier transformation (IFFT) is utilized for obtaining the filed distribution on the object plane, as represented by $$U_1 = IFFT(FU_1). \quad (14)$$

The disadvantage of directly using Equations (11) to (14) for calculation is that the resolution on the object plane is limited to that on the initial plane. To use $U_{mn}$ to obtain a high-resolution object plane image, it has to estimate based on wave propagation. The calculation for the wave propagation can be: (1) expanding by interpolation for the initial plane; (2) expanding by interpolating the initial plane and then propagating with the divided equal parts; (3) using Fresnel transform; and (4) directly evaluating integrals by using Rayleigh-Sommfeld formula. They are described as follows.

(1) Expanding by Interpolation for the Initial Plane

The matrix $S_{mn}$ is expanded by equal interval interpolation into a M×N-times matrix. The spectrum distribution (TargetF) on the object plane can be calculated by the following equations:

$$TargetF = FFT(S_{mn}) \exp(i2\pi z_0/\lambda (1-\alpha^2-\beta^2)^{0.5}), \quad (15)$$

$$\alpha = t_1 \lambda / mL_x, \quad (16)$$

$$\beta = t_2 \lambda / nL_y, \quad (17)$$

where $L_x$ and $L_y$ respectively are the lengths in the x direction and y direction, which the image range of the image detector corresponds to, $t_1$ indicates $t_1$-th column in the matrix, $t_2$ indicates $t_2$-th row in the matrix, and $z_0$ represents the distance between the object plane and the image detector. Finally, an inverse fast Fourier transformation (IFFT) is utilized for obtaining the filed distribution on the object plane, as represented by $$Target = IFFT(TargetF) \quad (18)$$

(2) Expanding by Interpolating the Initial Plane and then Propagating with the Divided Equal Parts Firstly, the matrix $S_{mn}$ is expanded by equal interval interpolation into a M×N-times matrix. Then, the initial plane is divided into $D_x$ and $D_y$ parts respectively along the x direction and y direction, represented by $Sd_i$ and $Sd_j$ (i.e., the $d_i$-th part in the x direction and the $d_j$-th part in the y direction). The center is located at $$\left( \frac{d_i - 0.5}{D_x} mL_x - \frac{mL_x}{2}, \frac{d_j - 0.5}{D_y} nL_y - \frac{nL_y}{2} \right).$$

Each equal part is then propagated to the central position of the object plane.

Next, an angular spectrum propagating approach is utilized to calculate the angular spectrum distribution on the object plane, as follows.

$$FSd_{ij} = FFT(Sd_{ij}) \exp(i2\pi z_0/\lambda (1-\alpha^2-\beta^2)^{0.5}), \quad (19)$$

Taking the position of $Sd_{ij}$ into consideration, the angular spectrum distribution at the central position of the object plane for Targetd$_{ij}$ can be calculated by $$TargetFd_{ij} = FSd_{ij}(v_x, v_y) \quad (20)$$
$$\exp\left(-i2\pi\left(v_x mL_x\left(\frac{d_i-0.5}{D_x}-\frac{1}{2}\right) + v_y nL_y\left(\frac{d_j-0.5}{D_y}-\frac{1}{2}\right)\right)\right),$$

wherein ($v_x$, $v_y$) is a point in the coordinate system of angular spectrum, represented as follows.

$$v_x = t_1/mL_x, \quad (21)$$

$$v_y = t_2/nL_y, \quad (22)$$

After using the aforesaid equations to calculate the angular spectrum distributions that the respective augmented mirror matrix propagates to the object plane, the respective angular spectrum distributions can be added up so as to obtain the angular spectrum distribution on the object plane, represented by $$TargetF = \sum_{i=1}^{D_x} \sum_{j=1}^{D_y} TargetFd_{ij}, \quad (23)$$

Finally, an inverse fast Fourier transformation is utilized for obtaining the filed distribution on the object plane. The calculation is the same as Equation (18), as represented by $$Target = IFFT(TargetF) \quad (24)$$

(3) Using Fresnel Transform

When the distance between the object plane and the image detector is long enough, Fresnel transform can be used to calculate the filed distribution on the object plane. The coordinate corresponding to each element in $S_{mn}$ are:

$$x_{mn} = t_1 B_x - \frac{mL_x}{2}, \quad (25)$$

$$y_{mn} = t_2 B_y - \frac{nL_y}{2}, \quad (26)$$

where $t_1$ indicates $t_1$-th column in the matrix, $t_2$ indicates $t_2$-th row in the matrix, and $B_x$ and $B_y$ are pixel pitches of the image detector respectively in the x direction and y direction.

In the two-stage Fresnel transform, the first stage is to propagate to an intermediate plane by using Fresnel transform. The intermediate plane and $S_{mn}$ is separated by $z_a$, and the intermediate plane and the object is separated by $z_b$. The magnifying power of the eventual resolution on the object plane is a ratio of $z_b$ to $z_a$. Actually, $z_a$ and $z_b$ can be calculated from the total distance $z_o$ and the objective magnification (Mag) as follows.

$$z_a = \frac{z_0}{1+Mag}, \tag{27}$$

$$z_b = \frac{Mag \cdot z_0}{1+Mag}, \tag{28}$$

At this time, the filed distribution formed on the intermediate plane can be calculated by the following equation.

$$S_{mid} = FFT\left[S_{mn}\exp\left(\frac{\pi i}{\lambda}\frac{x_{mn}^2 + y_{mn}^2}{z_a}\right)\right]\exp\left(\frac{\pi i}{\lambda}\frac{x_{mid}^2 + y_{mid}^2}{z_a}\right), \tag{29}$$

where $(x_{mid}, y_{mid})$ is a point in the coordinate system of the intermediate plane, represented as follows.

$$x_{mid} = \frac{t_1 \lambda z_a}{mL_x} - \frac{\lambda z_a}{2B_x}, \tag{30}$$

$$y_{mid} = \frac{t_2 \lambda z_a}{nL_y} - \frac{\lambda z_a}{2B_y}, \tag{31}$$

In the two-stage Fresnel transform, the second stage is to propagate from the intermediate plane to the object plane. The filed distribution on the object plane can be represented by $$Target = FFT\left(S_{mid}\exp\left(\frac{\pi i}{\lambda}\frac{x_{mid}^2 + y_{mid}^2}{z_b}\right)\right)\exp\left(\frac{\pi i}{\lambda}\frac{\xi^2 + \eta^2}{z_b}\right), \tag{32}$$

where $(\xi, \eta)$ is a point in the coordinate system of the object plane. The image resolution can be adjusted by altering the ratio of $z_b$ to $z_a$, represented as follows.

$$\xi = \frac{z_b}{z_a} x_{mn}, \tag{33}$$

$$\eta = \frac{z_b}{z_a} y_{mn}, \tag{34}$$

(4) Directly Evaluating Integrals by Using Rayleigh-Sommfeld Formula

In the use of Rayleigh-Sommfeld diffraction theory, the coordinate corresponding to each element in $S_{mn}$ are:

$$x_{mn} = t_1 B_x - \frac{mL_x}{2}, \tag{35}$$

$$y_{mn} = t_2 B_y - \frac{nL_y}{2}, \tag{36}$$

$$z_{mn} = 0, \tag{37}$$

Assuming that the coordinate system of the object plane is represented by $(\xi, \eta, z_o)$, the distance r between the object plane and each pixel in $S_{mn}$ is calculated by $$r=\sqrt{(x_{mn}-\xi)^2+(y_{mn}-\eta)^2+(z_{mn}-z_0)^2}, \tag{38}$$

Substitute the previous equation into Rayleigh-Sommfeld diffraction theory for evaluating integrals. Then, the filed distribution on the object plane is obtained as follows.

$$Target = \int\int S_{mn}\frac{\exp(jkr)}{r}\frac{z_0}{r}dx_{mn}dy_{mn} \tag{39}$$

When the tilt angle θ of the side wall of the light pipe (i.e., the angle between the middle vertical line and the side wall) is equal to zero degree as shown in FIG. 1A and FIG. 1B, the augmented matrix $U_{ij}$ and the original data matrix $U_{00}$ lie at the same plane in the space. When the tilt angle θ of the side wall of the light pipe is not equal to zero degree as shown in FIGS. 5A to 5D, the augmented matrix $U_{ij}$ and the original data matrix $U_{00}$ does not locate at the same plane in the space though the data matrix may be expanded by mirror reflections. In this situation, the augmented matrix $U_{ij}$ has to be rotated for 2θ degrees in the space.

Since the augmented matrix $U_{ij}$ and the original matrix $U_{00}$ are not at the same plane, it cannot use the aforesaid approaches to calculate the filed distribution on the object plane. Accordingly, calculations on the wave propagation are required to use the following two solutions: (1) directly evaluating integrals by using Rayleigh-Sommfeld formula; and (2) Angular spectrum propagation between tilting planes.

(1) Directly Evaluating Integrals by Using Rayleigh-Sommfeld Formula

Rayleigh-Sommfeld diffraction theory is used to calculate each $Target_{ij}$, and then add them up. Taking $Target_{10}$ for example, the space coordinate corresponding to each element in $U_{10}$ are:

$$x_{10} = t_1 B_x \cos(2\theta) + \frac{L_x}{2}, \tag{40}$$

$$y_{10} = t_2 B_y - \frac{L_y}{2}, \tag{41}$$

$$z_{10} = t_1 B_x \sin(2\theta), \tag{42}$$

where $t_1$ indicates $t_1$-th column in the matrix, $t_2$ indicates $t_2$-th row in the matrix, and $B_x$ and $B_y$ are pixel pitches of the image detector respectively in the x direction and y direction. On the basis of this space coordinate, the reference light $R_{10}$ propagating to this position can be calculated. Then, multiply $U_{10}$ by conjugate beam $R_{10}^*$ of the reference light so as to obtain a matrix $S_{10}$, represented as follows.

$$S_{10}=R_{10}^*U_{10} \tag{43}$$

The unit vector perpendicular to a plane corresponding to the matrix $S_{10}$ is:

$$\vec{n} = (-\sin(2\theta), 0, \cos(2\theta)), \tag{44}$$

Assuming that $(\xi, \eta, z_o)$ is a point in the coordinate system of the object plane, a vector connecting each element in $S_{10}$ to a specific point on the object plane can be represented by $$\vec{r_{10}} = (\xi - x_{10}, \eta - y_{10}, z_0 - z_{10}), \tag{45}$$

The distance $r_{010}$ between the object plane and each element in $S_{10}$ is denoted as $|r_{010}|$. The corresponding Target$_{10}$ can be calculated by substituting $S_{10}$ into Rayleigh-Sommfeld diffraction theory, as follows.

$$Target_{10} = \int\int\int S_{10} \frac{\exp(jkr_{10})}{r_{10}} \frac{\vec{r_{10}}\cdot\vec{n}}{r_{10}|n|} dx_{10}dy_{10}dz_{10}, \quad (46)$$
$$= \int\int S_{10} \frac{\exp(jkr_{10})}{r_{10}} \frac{\vec{r_{10}}\cdot\vec{n}}{r_{10}|n|} dX_{10}dY_{10}$$

After calculating the corresponding filed distribution Target$_{ij}$ on the object plane for each matrix $S_{ij}$ by the same way, the obtained filed distributions from above calculations are added up so as to obtain the filed distribution on the object plane as represented as follows.

$$Target = \sum_{i=0}^{m}\sum_{j=0}^{n} Target_{ij}, \quad (47)$$

For the above calculations, the computing speed depends on the number of sampling points on the object plane. When the number of sampling points is too large, the computing speed will decrease. An improvement is to use any one of approaches that can calculate $S_{mn}$ to estimate Target$_{00}$ corresponding to $S_{00}$, use Rayleigh-Sommfeld diffraction theory to calculate Target$_{ij}$ except for Target$_{00}$, and then add them up.

(2) Angular Spectrum Propagation Between Tilting Planes

Firstly, an angular spectrum propagating approach is utilized to calculate the angular spectrum distribution on the object plane, as follows.

$$FS_{10}=FFT(S_{10})\exp(i2\pi z_{10}/\lambda(1-\alpha^2-\beta^2)^{0.5}) \quad (48)$$

wherein the propagating distance is:

$$z_{10} = \left(\frac{z_0}{\cos(2\theta)} - \frac{L_x\tan(2\theta)}{2}\right), \quad (49)$$

Next, use a coordinate transformation matrix to convert the coordinates of the angular spectrum, as follows.

$$\begin{bmatrix} v'_{x0} \\ v'_{y0} \\ v'_{z0} \end{bmatrix} = Rot_{10} \begin{bmatrix} v_x \\ v_y \\ v_z \end{bmatrix}, \quad (50)$$

wherein the rotation matrix is:

$$Rot_{10} = \begin{bmatrix} \cos2\theta & 0 & -\sin2\theta \\ 0 & 1 & 0 \\ \sin2\theta & 0 & \cos2\theta \end{bmatrix}, \quad (51)$$

The filed distribution $FS_{10}$ ($v_x$, $v_y$, $v_z$) using the original coordinates of the angular spectrum is mapped to the new coordinate system. The filed distribution in the new coordinate system is denoted as $RFS_{10}$ ($v_{x0}'$, $v_{y0}'$, $v_{z0}'$). If $v_{z0}'$ is smaller than zero or $v_{z0}'$ has an imaginary part, i.e., $$v_{z0}'<0, \quad (52)$$
$$Im[v_{z0}']\neq 0, \quad (53)$$

then the corresponding filed distribution is set as zero. Next, the converted angular spectrum distribution is mapped to the equal-interval distributed angular spectrum coordinate system by interpolation so as to obtain new $RFS_{10}$ ($v_x'$, $v_y'$, $v_z'$).

Then, the center of spectrum distribution is moved to the center of the object plane. The displacement is:

$$\Delta\xi_{10} = \frac{L_x\cos(2\theta)}{2} + L_x - \tan(2\theta)\left[z_0 - \frac{L_x\sin(2\theta)}{2}\right], \quad (54)$$

The spectrum distribution of Target$_{10}$ can be calculated by $$TargetF_{10}=RSF(v_x',v_y',v_z')\exp(-i2\pi v_x'\Delta\xi_{10}), \quad (55)$$

After calculating the angular spectrum distribution on the object plane propagated from each augmented mirror matrix by using above calculations, the respective angular spectrum distributions are added up so as to obtain the angular spectrum distribution of the object, as follows.

$$TargetF = \sum_{i=0}^{m}\sum_{j=0}^{n} TargetF_{ij}, \quad (56)$$

Finally, an inverse fast Fourier transformation is utilized for obtaining the filed distribution on the object plane, represented as follows.

$$Target=IFFT(TargetF)° \quad (57)$$

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A digital hologram recording system, which is used for capturing an image of an object and recording it as a holographic data, said system comprising:
   signal light, formed after irradiating the object with a light source;
   an image detector, for recording interference fringes of the signal light; and
   a light pipe, arranged in a path of the signal light and located between the object and the image detector,
   wherein
   the light pipe has a reflection surface,
   the reflection surface is utilized to collect the signal light scattered at a large angle,
   the reflection surface is a side surface of the light pipe having a reflecting film coated thereon,
   a part of the signal light directly enters the image detector after passing through the light pipe,
   a part of the signal light enters the image detector after reflected by the reflection surface of the light pipe, and
   the collected signal light by the light pipe is equivalent to several times of pixel counts of the image detector.

2. The digital hologram recording system according to claim 1, wherein a transverse section of the light pipe is rectangular.

3. The digital hologram recording system according to claim 1, wherein the light pipe has a side wall, and an angle between the side wall of the light pipe and a middle vertical line perpendicular to a detection plane of the image detector is an acute angle.

4. The digital hologram recording system according to claim 3, wherein an angle between the side wall of the light pipe and the middle vertical line perpendicular to the detection plane of the image detector is between −70° and 70°.

5. The digital hologram recording system according to claim 1, wherein the signal light is interfered with light rays emitted from the light source so as to generate the interference fringes.

6. The digital hologram recording system according to claim 1, wherein the light source is used to irradiate the object with divergent spherical wave.

7. The digital hologram recording system according to claim 1, wherein the signal light is interfered with a reference beam so as to generate the interference fringes.

8. The digital hologram recording system according to claim 7, further comprising a beam splitter, wherein light rays emitted from the light source is split into two beams by the beam splitter, one of the two serves as the reference beam, and the other one forms the signal light after irradiating the object.

9. A numerical reconstruction method for a hologram, which is applicable to an optical framework having a light pipe arranged between an image detector and an object to be captured, said method comprising steps of:
utilizing the image detector to capture an interference image of the object;
converting the interference image into a data matrix;
performing multiple times of mirror reflections along multiple edges of the data matrix to expand to a new data matrix; and
performing numerical reconstruction with the new data matrix so as to obtain field distribution on a plane where the object is located at.

10. The numerical reconstruction method according to claim 9, wherein the step of utilizing the image detector to capture the interference image of the object comprises:
taking pictures of the same scene for many times with different time lengths for exposure; and
recombining the obtained multiple pictures so as to acquire the interference image of the object.

11. The numerical reconstruction method according to claim 9, wherein if the object and a light source used to generate a reference beam are located at the same plane parallel to a surface of the image detector and the reference beam is consisted of divergent spherical waves, a fast Fourier transform is used to do calculations with the new data matrix so as to obtain the field distribution on the plane where the object is located at.

12. The numerical reconstruction method according to claim 11, wherein the new data matrix is multiplied by a phase term and then the fast Fourier transform is used to do calculations so as to obtain the field distribution on the plane where the object is located at.

13. The numerical reconstruction method according to claim 9, wherein in the process of calculating the field distribution on the plane where the object is located at, an angular spectrum propagating approach is used to perform the numerical reconstruction with the new data matrix so as to obtain the field distribution on the plane where the object is located at.

14. The numerical reconstruction method according to claim 9, wherein in the process of calculating the field distribution on the plane where the object is located at, an initial plane is processed by interpolation for doing estimation based on wave propagation.

15. The numerical reconstruction method according to claim 14, wherein in the process of calculating the field distribution on the plane where the object is located at, an initial plane is processed by interpolation and is divided into equal parts for doing estimation based on wave propagation.

16. The numerical reconstruction method according to claim 9, wherein in the process of calculating the field distribution on the plane where the object is located at, Fresnel transform is used for doing estimation based on wave propagation.

17. The numerical reconstruction method according to claim 9, wherein in the process of calculating the field distribution on the plane where the object is located at, Rayleigh-Sommerfeld formula is used for doing estimation based on wave propagation.

18. The numerical reconstruction method according to claim 9, wherein 0 is defined as an angle between a side wall of the light pipe and a normal direction of the image detector, the corresponding data matrix is rotated in the space along a rotational direction of the side wall for 20 degrees in the step of performing mirror reflections along the edges of the data matrix.

19. The numerical reconstruction method according to claim 18, wherein in the process of calculating the field distribution on the plane where the object is located at, Rayleigh-Sommerfeld formula is used for doing estimation based on wave propagation.

20. The numerical reconstruction method according to claim 9, wherein angular spectrum propagation between tilting planes is utilized in the process of calculating the field distribution on the plane where the object is located at.

21. A digital hologram recording system, which is used for capturing an image of an object and recording it as a holographic data, said system comprising:
signal light, formed after irradiating the object with a light source;
an image detector, for recording interference fringes of the signal light; and
a light pipe, arranged in a path of the signal light and located between the object and the image detector,
wherein
the light pipe is solid and has a total-reflection interface for reflecting light rays by total reflection,
the total-reflection surface is utilized to collect the signal light scattered at a large angle,
a part of the signal light directly enters the image detector after passing through the light pipe,
a part of the signal light enters the image detector after reflected by the reflection surface of the light pipe, and
the collected signal light by the light pipe is equivalent to several times of pixel counts of the image detector.

* * * * *